PREPARE MIXTURE OF VINYL RESIN PLASTISOL,
NON-IONIC SURFACE-ACTIVE AGENT,
ALKALI METAL SALT OF
SULFONATED FATTY ALCOHOL, AND
ALKALI METAL SALT OF ETHYLENE
DIAMINE TETRAACETIC ACID

↓

MECHANICALLY FROTH THE MIXTURE
TO INCORPORATE AIR

↓

SHAPE THE FROTH

↓

HEAT THE SHAPED FROTH
TO FUSE THE PLASTISOL

↓

COOL TO OBTAIN
PLASTICIZED VINYL RESIN
SPONGE

INVENTOR.
PAUL V. BUTSCH
BY James J. Long
AGENT

United States Patent Office 2,861,963
Patented Nov. 25, 1958

2,861,963

PROCESS OF MAKING VINYL RESIN PLASTIC SPONGE

Paul V. Butsch, South Bend, Ind., assignor to United States Rubber Company, New York, N. Y., a corporation of New Jersey Application July 3, 1957, Serial No. 669,798

6 Claims. (Cl. 260—2.5)

This invention relates to a process of making a plasticized vinyl resin sponge. More particularly it relates to a process of making a product having a cellular structure resembling somewhat that of latex foam rubber which, as is well-known, is made by beating air into rubber latex to which a sensitizing agent and vulcanizing and compounding ingredients have been added, followed by shaping and vulcanization.

This application is a continuation-in-part of my copending application Serial No. 436,540, filed June 14, 1954, now abandoned.

The principal object of the present invention is to provide a simple, commercially feasible, and highly effective process of making a plasticized vinyl resin sponge which obviates the necessity for external gassing with an inert gas such as carbon dioxide, and which avoids the necessity of using a chemical blowing agent with the attendant complication and expense. Another object is to provide such a process which yields a soft foamed product having excellent physical properties and characterized by low specific gravity or density and by breathability similar to that of latex foam rubber. Another object is to provide such a process wherein ordinary air is simply incorporated into the original mobile or fluent mixture by mechanical frothing in the same way as that by which air is incorporated into the aforementioned rubber latex composition in the manufacture of latex foam rubber. Numerous other objects will more fully hereinafter appear.

The accompanying drawing, which is self-explanatory, portrays diagrammatically the manufacture of plasticized vinyl resin sponge in accordance with my invention.

I have discovered that plasticized vinyl resin sponge having very desirable physical properties can easily and economically be manufactured by mechanically frothing an intimate mixture comprising a plastisol of a particulate thermoplastic vinyl resin selected from the group consisting of polyvinyl chloride and copolymers of a major proportion of vinyl chloride and a minor proportion of a copolymerizable monomer, and a high-boiling organic liquid plasticizer for the resin, a non-ionic surface-active agent, an alkali metal salt of a sulfonated fatty alcohol, and an alkali metal salt of ethylene diamine tetraacetic acid, whereby the surrounding gas is incorporated in and retained by the mixture, subsequently heating the resulting froth at a temperature and for a time sufficient to fuse the resin particles with the plasticizer while maintaining the froth structure, and cooling the resulting material to room temperature.

My experiments have shown that it is necessary to use the three aforementioned ingredients, namely the non-ionic surface-active agent, the alkali metal salt of a sulfonated fatty alcohol, and the alkali metal salt of ethylene diamine tetraacetic acid, in combination, in conjunction with the plastisol in order to obtain a product having a sufficiently low density. If any one of these three materials is omitted, the density of the product becomes excessively high. Apparently these three materials cooperate in some way to bring about new and unexpected results, namely the retention of the froth structure during the heating which is done to effect fusion of the resin and the plasticizer.

In practicing my invention, I can use any conventional plastisol. As is well-known, plastisols are fluent mixtures of particulate vinyl resins and high-boiling organic liquid plasticizers therefor which are substantially non-solvents for the resin at ordinary temperatures, i. e., not over 100° F., but are capable of dissolving the resin at elevated temperatures above 100° F. and more commonly ranging from 300° to 350° F., to form a single phase material, sometimes referred to as a gel, which upon cooling to room temperature yields a product which is solid and has good strength.

The vinyl resin of the plastisol can be any of the conventional thermoplastic, normally solid, vinyl resins commonly used in making plastisols. It may be either polyvinyl chloride or a copolymer of a major proportion of vinyl chloride and a minor proportion of a copolymerizable monomer which may be vinyl acetate, vinylidene chloride, diethyl maleate, diethyl fumarate, etc., the relative proportions of combined monomers usually being equal to 85–95% vinyl chloride and 15–5% copolymerizable monomer.

Any of the conventional high-boiling organic liquid plasticizers commonly used in making plastisols can be employed in practicing my invention. The plasticizer should be substantially a non-solvent for the resin at temperatures not over 100° F. so that no fusion takes place until during the step of heating the frothed mixture. The plasticizer should be capable of dissolving the resin at moderately elevated temperatures, say at 300–350° F. The plastisol grade resin is mixed with the plasticizer to form a paste-like dispersion with which the other three ingredients and any desired additional components such as coloring material, fillers, stabilizers for the resin, etc. are incorporated. So far as I have been able to determine, the order of incorporating the several ingredients to form the fluent mixture subjected to frothing is immaterial.

The plasticizer is usually an ester, ether, or ketone or a mixture of two or more compounds of this type. Examples are tricresyl phosphate, octyl diphenyl phosphate, dibutyl phthalate, dioctyl phthalate, dibutyl sebacate, dioctyl sebacate, butyl phthalyl, butyl glycolate, linear polyester resin plasticizers such as are disclosed at Industrial and Engineering Chemistry, 37,504 (1945) e. g., "Paraplex G–50" manufactured by Rohm and Haas, and plasticizers made by introducing epoxy groups into a drying oil, e. g., soy bean oil, an example of the latter type of plasticizer being "Paraplex G–60." In practice a mixture of several plasticizers will almost invariably be used.

I have found that superior results are achieved when the plasticizer comprises a major proportion of octyl diphenyl phosphate. For some reason, not now known to me, this particular plasticizer gives a foamed product having an unusually low density. In fact, by using a plasticizer containing more than 50% of this compound, I can make products having a density substantially lower than 500 grams per liter.

The relative amounts of resin and plasticizer can vary widely depending upon many factors. As will be obvious, the amount of plasticizer should be such as to form a solid material after fusion of the resin and plasticizer. This solid material should have sufficient strength to cause the final cellular product to adequately resist conditions encountered in normal service. Typically the amount of plasticizer will range from 50 to 400 parts per 100 parts of resin. More commonly, I will employ from 100 to 150 parts of plasticizer per 100 parts of resin.

Examples of the non-ionic surface-active agents that can be used in my invention are:

(1) Monoethers of polyglycols with long-chain fatty alcohols, such as reaction products of ethylene oxide or polyethylene glycol with a long-chain fatty alcohol (e. g. the reaction product of ethylene oxide and oleyl alcohol, viz., $C_{18}H_{35}$—$(OC_2H_4)_nOH$ where $n$ is 10 to 20).

(2) Monoesters of polyglycols with long-chain fatty acids, such as reaction products of ethylene oxide or polyethylene glycol with a long-chain fatty acid (e. g. reaction product of ethylene oxide or polyethylene glycol with oleic acid, viz.,

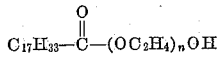

where $n$ is 10 to 20). An example of such a material is "Emulphor ELA."

(3) Monoethers of polyglycols with alkylated phenols, such as reaction products of ethylene oxide or polyethylene glycol with an alkyl phenol (e. g. reaction product of ethylene oxide and isopropyl phenol, viz.,

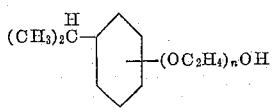

where $n$ is 10 to 20).

(4) Partial esters of polyhydric alcohols with long-chain monocarboxylic (fatty and/or resin) acids (e. g. glycerol monostearate, sorbitan trioleate).

The amount of the non-ionic surface-active agent is preferably equal to from 1 to 25 parts by weight based on 100 parts of the vinyl resin. I have obtained very good results using approximately 5.9 parts of the surface-active agent per 100 parts of resin.

The alkali metal salts of sulfonated fatty alcohols are well-known materials. These materials are often termed alkyl sulfates of eight to eighteen or more carbon atoms. They are also often called "sulfated alcohols," their manufacture being described on pages 53–66 of "Surface Active Agents" by Schwartz and Perry, published 1949 by Interscience Publishers. Examples are sodium oleyl sulfate and sodium dodecyl (or lauryl) sulfate. Examples of commercial forms of the latter are "Duponol WA" and "Duponol ME." I usually employ the sodium salt of the sulfonated fatty alcohol. The amount of this ingredient can range from 3 to 100 parts per 100 parts of resin. I have obtained very good results using approximately 29.4 parts of "Duponol WA" per 100 parts of resin.

The alkali metal salts of ethylene diamine tetraacetic acid are also well-known materials. Usually I employ the sodium salts. I prefer to use those salts containing at least two atoms of alkali metals per molecule. In other words I prefer to employ the di-, tri- or tetra-alkali metal salts of ethylene diamine tetraacetic acid. An example of a suitable salt is that sold commercially as "Nullapon BFC." Other examples are the materials sold under the trade name "Sequestrene" by the Alrose Chemical Co. of Providence, Rhode Island. I have obtained very good results using "Sequestrene NA2" (the technically pure disodium salt, the dihydrate), "Sequestrene NA3" (the technically pure trisodium salt, the monohydrate), "Sequestrene NA4" (the technically pure tetrasodium salt, the monohydrate), and "Sequestrene ST" (the technical tetrasodium salt in the form of an 80% powder). I prefer to use the solid alkali metal salts of ethylene diamine tetraacetic acid and I believe that the more nearly anhydrous the salts are, the better the results.

The amount of the alkali metal salt of ethylene diamine tetraacetic acid can range from 1 to 25 parts per 100 parts of resin. I have obtained very good results using approximately 5.9 parts.

Following preparation of a uniform mixture of the plastisol and the foregoing three ingredients, this mixture is mechanically frothed in any suitable way so as to incorporate the surrounding gas, almost invariably air, into the mixture and form a self-supporting, long-lasting froth. This step may be performed in a manner similar to that by which air is beaten into a rubber latex compound in the manufacture of latex foam rubber. The amount of air incorporated in the mixture in this step can vary widely depending upon the density desired of the final product. Since the froth retains substantially all of the incorporated air during the subsequent heating step, it is readily possible to control the density of the final product by controlling the amount of air incorporated in the frothing step. Usually I incorporate sufficient air to give a final product having a density not over 700 grams per liter.

Following the frothing step, the resulting froth is shaped to the form desired in the final article. For example, it can be poured into a suitable form or it can be continuously fed onto a belt carrying it through a heating zone to form continuous flat stock.

The shaped mixture is heated in any suitable way, as in a hot air oven, to fuse the resin and plasticizer into a single phase. The temperature and time of heating should of course be such as to effect complete fusion of the resin particles and the plasticizer. No special precautions have to be observed in order to prevent collapse of the sponge during this heating step. I prefer to employ a temperature of from 300 to 350° F. and a time ranging from 60 minutes at the lower temperature to 10 minutes at the higher temperature. The heating step is conducted at atmospheric pressure.

The resulting fused sponge is then cooled down to room temperature, i. e., 100° F. or lower, whereupon it is ready for use.

The following examples illustrate my invention more fully. All parts expressed in this specification and in the appended claims are by weight.

The following basic plastisol composition was used in the examples:

| | Parts |
|---|---|
| Vinyl resin (copolymer of 95% vinyl chloride-5% vinyl acetate) | 100 |
| Plasticizer (octyl diphenyl phosphate) | 139 |
| Stabilizer (dibasic lead phosphite) | 6.6 |

Other vinyl resins, other plasticizers, and other stabilizers for vinyl resins, may be substituted for the foregoing with equivalent results.

*Examples 1 to 5*

Separate portions of the above mixture were intimately admixed with "Emulphor ELA," "Duponol WA" and either "Nullapon BFC" or one of the "Sequestrenes" in the amounts shown in the following tabulation. The resulting mixtures were then frothed for 15 minutes using a household egg beater type mixer after which the frothed mixtures were fused for 45 minutes at 310° F. The proportions of the three added ingredients, the original densities of the mixtures (before frothing) and the densities of the final products are shown in the following tabulation.

| Example | 1 | 2 | 3 | 4 | 5 |
|---|---|---|---|---|---|
| "Emulphor ELA" | 5.9 | 5.9 | 5.9 | 5.9 | 5.9 |
| "Duponol WA" | 29.4 | 29.4 | 29.4 | 29.4 | 29.4 |
| "Nullapon BFC" | 5.9 | | | | |
| "Sequestrene NA2" | | 5.9 | | | |
| "Sequestrene NA3" | | | 5.9 | | |
| "Sequestrene NA4" | | | | 5.9 | |
| "Sequestrene ST" | | | | | 5.9 |
| Original density of mixture, before frothing, grams/liter | 1,050 | 1,060 | 1,110 | 1,120 | 1,130 |
| Density of final sponge, grams/liter | 505 | 515 | 525 | 490 | 450 |

In each case, the product had a fine, uniform pore structure, an attractive white appearance, and excellent compressibility and resilience.

*Examples 6 to 14*

Using the same basic formulation and technique as described in Examples 1 to 5, the effect of omitting one, two or all three of the extraneous ingredients in accordance with my invention was determined. The amounts of added ingredients and the density data were as follows:

| Example | 6 | 7 | 8 | 9 | 10 | 11 | 12 | 13 | 14 |
|---|---|---|---|---|---|---|---|---|---|
| "Emulphor ELA" | | | | 5 | 5 | | 5 | 5 | 5 |
| "Duponol WA" | | 25 | | | 25 | 25 | 25 | | 25 |
| "Nullapon BFC" | | | 5 | | 5 | 5 | | 5 | |
| "Sequestrene ST" | | | | | | | | | 5 |
| Original Density | 1,050 | 1,080 | 1,090 | 1,110 | 1,110 | 1,160 | 1,125 | 1,100 | 1,070 |
| Density of final sponge | 1,050 | 1,090 | 1,070 | 980 | 515 | 1,130 | 930 | 1,090 | 525 |

It will be seen (Example 6) that omission of all three extraneous ingredients results in no lowering of density; that omission of any two of the three extraneous ingredients results in no or only very slight lowering of density (Examples 7 to 9); and that omission of any one of the three extraneous ingredients results in no or only very slight lowering of density (Examples 11 to 13). In contrast (Examples 10 and 14), use of all three ingredients gives a remarkable lowering in density.

From the foregoing, it will be seen that the present invention provides a simple yet effective process of economically making plasticized vinyl resin sponge. The process of my invention is much cheaper than using a chemical blowing agent. It is also much cheaper than external gassing of the plastisol with an inert gas such as carbon dioxide under high pressure as taught for example in Schwencke U. S. Patent No. 2,666,036, issued January 12, 1954. By means of my invention, it is readily possible to control the density of the final product within wide limits by simply controlling the amount of air incorporated in the frothing step. Numerous other advantages of my invention will more fully hereinafter appear.

Having thus described my invention, what I claim and desire to protect by Letters Patent is:

1. The process of making a plasticized vinyl resin sponge which comprises mechanically frothing an intimate mixture of a plastisol comprising 100 parts of a particulate thermoplastic vinyl resin selected from the group consisting of polyvinyl chloride, vinyl chloride-vinyl acetate copolymer, vinyl chloride-vinylidene chloride copolymer, vinyl chloride-diethyl maleate copolymer, and vinyl chloride-diethyl fumarate, the relative proportions of combined monomers in the said copolymers being equal to 85–95% of vinyl chloride and 15–5% of the other stated monomer, and from 50 to 400 parts of a high boiling organic liquid plasticizer for said resin, from 1 to 25 parts of a non-ionic surface-active agent, from 3 to 100 parts of an alkali metal salt of a sulfonated fatty acid, and from 1 to 25 parts of an alkali metal salt of ethylene diamine tetraacetic acid, and thereby incorporating a surrounding gas in said mixture, subsequently heating the resulting froth at a temperature and for a time sufficient to fuse the resin particles with said plasticizer while maintaining the froth structure, and cooling the resulting material to room temperature.

2. The process of claim 1, wherein said non-ionic surface-active agent is a monoester of a polyglycol with a long-chain fatty acid.

3. The process of claim 1 wherein said surface-active agent is a monoester of a polyglycol with a long-chain fatty acid, wherein said alkali metal salt of a sulfonated fatty alcohol is sodium lauryl sulfate, and wherein said alkali metal salt of ethylene diamine tetraacetic acid is the tetrasodium salt.

4. The process of claim 1 wherein the amount of gas incorporated in the mixture in the frothing step is such as to give a product having a density of not over 700 grams per liter.

5. The process of making a plasticized vinyl resin sponge which comprises mechanically frothing an intimate mixture of approximately: 100 parts of particulate thermoplastic vinyl resin selected from the group consisting of polyvinyl chloride, vinyl chloride-vinyl acetate copolymer, vinyl chloride-vinylidene chloride copolymer, vinyl chloride-diethyl maleate copolymer, and vinyl chloride-diethyl fumarate copolymer, the relative proportions of combined monomers in the said copolymers being equal to 85–95% of vinyl chloride and 15–5% of the other stated monomer, 138 parts of octyl diphenyl phosphate, 5.9 parts of a monoester of a polyglycol with a long-chain fatty acid, 29.4 parts of sodium lauryl sulfate, 5.9 parts of the tetrasodium salt of ethylene diamine tetraacetic acid, and thereby incorporating the surrounding gas in said mixture, subsequently heating the resulting froth at a temperature and for a time sufficient to fuse the particulate vinyl resin with said octyl diphenyl phosphate while maintaining the froth structure, and cooling the resulting material to room temperature.

6. The process of claim 5 wherein the amount of gas incorporated in the mixture in the frothing step is such as to give a product having a density of not over 700 grams per liter.

No references cited.